(12) United States Patent
Bergemann et al.

(10) Patent No.: US 8,420,044 B2
(45) Date of Patent: Apr. 16, 2013

(54) CARBON BLACK, A PROCESS FOR PREPARATION THEREOF AND USE THEREOF

(75) Inventors: Klaus Bergemann, Kerpen-Sindorf (DE); Manfred Dannehl, Kahl am Main (DE); Ansgar Oelmann, Mobile, AL (US); Britta Schwartze, Hambrug (DE); Christoph Tontrup, Alzenau (DE)

(73) Assignee: Evonik Carbon Black GmbH, Hanau (DE)

( * ) Notice: Subject to any disclaimer, the term of this patent is extended or adjusted under 35 U.S.C. 154(b) by 150 days.

(21) Appl. No.: 12/883,585

(22) Filed: Sep. 16, 2010

(65) Prior Publication Data

US 2011/0076608 A1    Mar. 31, 2011

(30) Foreign Application Priority Data

Sep. 28, 2009  (DE) .......................... 10 2009 045 060

(51) Int. Cl.
*C09C 1/56* (2006.01)

(52) U.S. Cl.
USPC ...................................................... 423/449.2

(58) Field of Classification Search ................ 423/449.2
See application file for complete search history.

(56) References Cited

U.S. PATENT DOCUMENTS

| 4,075,156 | A | * | 2/1978 | Johnson ........................ 523/103 |
| 4,138,471 | A | | 2/1979 | Lamond et al. |
| 6,087,434 | A | | 7/2000 | Hisashi et al. |
| 6,440,628 | B1 | | 8/2002 | Watanabe et al. |
| 6,599,496 | B2 | | 7/2003 | Carter et al. |
| 8,034,316 | B2 | * | 10/2011 | Yurovskaya et al. ...... 423/449.2 |
| 2008/0159947 | A1 | | 7/2008 | Yurovskaya et al. |
| 2009/0155157 | A1 | | 6/2009 | Stenger et al. |

FOREIGN PATENT DOCUMENTS

| DE | 195 21 565 A1 | 1/1997 |
| DE | 196 13 796 A1 | 10/1997 |
| DE | 198 39 925 A1 | 10/1999 |
| EP | 0 845 712 | 6/1998 |
| EP | 1 102 127 A2 | 5/2001 |
| SU | 899589 | 1/1982 |
| WO | 98/42778 | 10/1998 |
| WO | 98/45361 | 10/1998 |
| WO | 03/021017 A1 | 3/2003 |
| WO | 2008/058114 | 5/2008 |
| WO | 2008/058114 A2 | 5/2008 |

OTHER PUBLICATIONS

European Search Report for Application No. EP 10 17 6576 dated Jan. 12, 2011.
Kleinschmit et al., "Ullmanns Encyklopädie der technischen Chemie", 1977, 4th edition, vol. 14, pp. 633-649.
Samanta, et al., "Polycyclic aromatic hydrocarbons: environmental pollution and bioremediation", Trends in Biotechnology, vol. 20, No. 6, Jun. 2002, pp. 243-248.
"8th Report on Carcinogens", 1998, Full Report, vol. I and vol. II. Cover sheet and p. III-869.
Code of Federal Regulations, Title 21—Food and Drugs, vol. 3, parts 170 to 199, Sec. 178-3297 Colorants for Polymers, High purity Furnace Blacks, 2 sheets.
"Determination of PAH content of carbon black", Cabot Corporation, Jul. 8, 1994, laid down by the American Food and Drug Administration (FDA), (Code of Federal Regulations, Tile 21, vol. 3, part 170-199, Sec. 178-3297 Colorants for Polymers, High purity Furnace Blacks.

* cited by examiner

*Primary Examiner* — Stuart Hendrickson
(74) *Attorney, Agent, or Firm* — Smith, Gambrell & Russell, LLP

(57) ABSTRACT

Carbon black with a content of polycyclic aromatic hydrocarbons measured by the 22 PAH method of less than 5 ppm and an STSA surface area of <90 m²/g. The carbon black is prepared by treating the starting carbon black with electromagnetic radiation. The carbon black can be used in rubber, plastics, printing inks, liquid inks, inkjet inks, toners, coating materials, paints, adhesives, batteries, pastes, paper, fuel cells, bitumen, concrete and other building materials.

3 Claims, 2 Drawing Sheets

CARBON BLACK, A PROCESS FOR PREPARATION THEREOF AND USE THEREOF

The invention relates to a carbon black, to a process for preparation thereof and to the use thereof.

Carbon blacks are employed extensively as a black pigment and as a reinforcer and filler. They are produced with different properties by different processes. The most common is the preparation by oxidative pyrolysis of carbon-containing carbon black raw materials. In this case, the carbon black raw materials are combusted incompletely at high temperatures in the presence of oxygen. This class of carbon black preparation processes includes, for example, the furnace black process, the gas black process and the lamp black process. Other processes are, for example, the acetylene process, the thermal black process and the plasma process.

The carbon-containing carbon black raw materials are predominantly aromatic carbon black oils. The product stream of the oxidative pyrolysis consists of an offgas comprising hydrogen and carbon monoxide, and fine carbon black suspended therein, which is removed from the offgas in a filter system (Ullmanns Enzyklopädie der technischen Chemie 4th Edition, Volume 14, pages 633-649).

According to the preparation process and process conditions, a carbon black may be contaminated with small amounts of organic compounds. These organic compounds may consist of a carbon skeleton which is in turn formed from polycyclic aromatic systems. According to the specific compound, the skeleton may have further branching or substitution.

The compounds whose carbon skeleton consists essentially of polycyclic aromatic systems are usually referred to as polycyclic aromatic hydrocarbons (PAHs). PAHs are considered to be compounds harmful to health (Sudip K. Samanta, Om V. Singh and Rakesh K. Jain: "Polycyclic aromatic hydrocarbons: environmental pollution and bioremediation", TRENDS in Biotechnology Vol. 20 No. 6 Jun. 2002, pages 243-248).

While the PAHs in systems in which the carbon black is bound in a fixed manner into a matrix or which do not in enable human contact usually do not constitute a problem, only carbon blacks with a very low content of polycyclic aromatic hydrocarbons (PAHs) are usable for some fields of use owing to the endangerment of health by the PAHs. This relates, for example, to the use of carbon black in applications with food contact. For instance, the American Food and Drug Administration has limited the PAH content for carbon blacks with food contact to 0.5 ppm (Code of Federal Regulations, Title 21, Volume 3, Part 170-199, § Colorants for Polymers, High purity Furnace Blacks, Page 372-376; CITE 21CFR178.3297).

To a certain degree, the PAH content can be influenced actually during the preparation, for example in the case of furnace blacks in the reactor. High temperatures and/or late clenching can reduce PAH contents from, for example, 100-150 ppm to 25-40 ppm (U.S. Pat. No. 4,138,471).

If, however, it is impossible through the reactor operating mode to achieve particularly low PAH contents, PAH present can be removed by aftertreating the carbon blacks.

It is known that the level of polycyclic aromatic hydrocarbons on carbon black can be reduced by thermal treatment of pelletized furnace black in a fluidized bed in the presence of at least 10% oxygen (U.S. Pat. No. 4,138,471). This can achieve amounts of less than 2 ppb for each of the compounds benzo(a)pyrene, dibenzo(a,h)anthracene or 7,12-dimethyl-benzo(a)anthracene.

It is additionally known that the level of polycyclic aromatic hydrocarbons on carbon nanomaterials can be lowered by extraction with a solvent (WO 03/021017).

Additionally known is a toner (U.S. Pat. No. 6,440,628) which comprises, inter alia, carbon black with PAH content less than 10 ppm, based on naphthalene, acenaphthylene, acenaphthene, fluorene, phenanthrene, anthracene, fluoranthene, pyrene, benzo(a)anthracene, chrysene, benzo(b)fluoranthene, benzo(a)pyrene, benzo(k,j)fluoranthene, dibenzo (a,h)anthracene, indeno(1,2,3-cd)pyrene and benzo(g,h,l) perylene.

Additionally known are rubber mixtures comprising a carbon black with a specific surface area of 13-19 $m^2/g$ and 0.25-0.28% by weight of polycyclic aromatic hydrocarbons (SU 899589) or a carbon black with a specific surface area of 50-57 $m^2/g$ and 0.21-0.23% by weight of polyaromatic hydrocarbons (SU 899589).

Additionally known from EP 1102127 is a toner which comprises a carbon black with PAH content less than 15 ppm, for example compounds such as benzpyrene, anthracene-benzopyrene, phenanthrene, pyrene and the like.

Also known from U.S. Pat. No. 6,087,434 is a pigment preparation which comprises a carbon black with PAH content less than 10 ppm, for example compounds such as naphthalene, fluorathene, fluoranthine, pyrene, chrysene, benzopyrenes and the like, and has a specific oxygen content of 0.2-0.4 $mg/m^2$.

Additionally known are medical contrast agents from U.S. Pat. No. 6,599,496, which comprise a carbon pigment with a reported PAH content below 0.5 ppm.

WO 2008/058114 describes carbon blacks whose PAH contents have been lowered by thermal treatment or extraction to values of 1-20 ppm or to values of $\leq$10 ppm.

Disadvantages of the known carbon blacks are the high proportions of polycyclic aromatic hydrocarbons, which are harmful to health.

A further disadvantage specifically in the case of thermal treatment of carbon blacks is the relatively significant lowering of the degree of oxidation, or of the volatile constituents at 950° C., and the associated reduction in the level of functional groups on the carbon black surface, such that the desired surface groups are removed partially or entirely especially in the case of oxidized starting carbon blacks.

It is an object of the invention to provide low-surface area carbon blacks which have a low PAH value and in some cases a high content of volatile constituents at 950° C.

Figure 1:
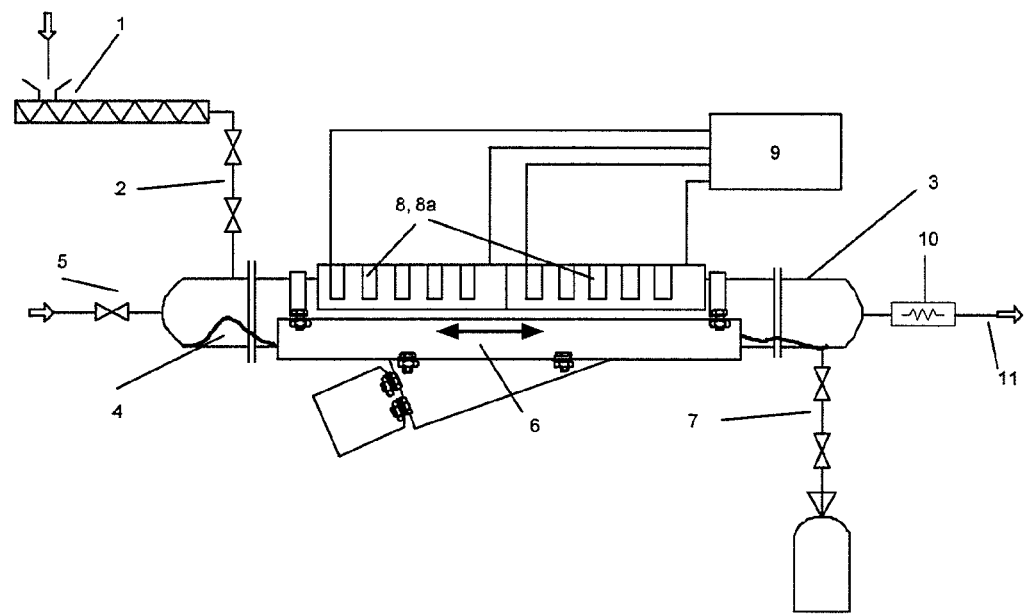
FIG. 1 shows an infrared (IR) delivery tube.

The invention provides a carbon black, which is characterized in that the content of polycyclic aromatic hydrocarbons measured by the 22 PAH method is less than 5 ppm, preferably less than 0.5 ppm, more preferably less than 0.4 ppm, most preferably less than 0.2 ppm, and the STSA surface area, measured to ASTM D-6556, is <90 $m^2/g$, preferably $\leq$80 $m^2/g$, more preferably 30-80 $m^2/g$, most preferably 55-80 $m^2/g$.

The content of polycyclic aromatic hydrocarbons of the 22 PAH method is calculated from the sum of the following compounds:
naphthalene, acenaphthylene, acenaphthene, fluorene, phenanthrene, anthracene, fluoranthene, pyrene, benzo(ghi) fluoranthene, cyclopenta(cd)pyrene, chrysene, benzo(e) pyrene, perylene, benzo(ghi)perylene, anthanthrene, coronene, benz(a)anthracene, benzo(k)fluoranthene, dibenz(ah)

anthracene, benzo(a)pyrene, indeno(1,2,3-cd)pyrene, benzo(b)fluoranthene and benzo(j)fluoranthene, where benzo(b)fluoranthene and benzo(j)fluoranthene are counted as one.

The 22 PAH method involves extracting the carbon black by means of a Soxhlet apparatus, performing the detection by means of gas chromatography and conducting the calculation taking account of the aforementioned 22 PAHs ("Determination of PAH content of carbon black", Cabot Corporation, Docket 95F-01631, 8 Jul. 1994, laid down by the American Food and Drug Administration (FDA) (Code of Federal Regulations, Title 21, Volume 3, Part 170-199, §Colorants for Polymers, High purity Furnace Blacks, Page 372-376; CITE 21CFR178.3297)).

The inventive carbon black may have a content of polycyclic aromatic hydrocarbons measured by the 15 PAH method of less than 5 ppm, preferably less than 1 ppm, more preferably less than 0.7 ppm, most preferably less than 0.12 ppm.

The content of polycyclic aromatic hydrocarbons of the 15 PAH method is calculated from the sum of the following compounds:
benz(a)anthracene, benzo(k)fluoranthene, dibenz(ah)anthracene, benzo(a)pyrene, indeno(1,2,3-cd)pyrene, benzo(b)fluoranthene and benzo(j)fluoranthene, dibenz(ah)acridine, dibenz(aj)acridine, 7H-dibenzo(cg)carbazole, dibenzo(ae)pyrene, dibenzo(ah)pyrene, dibenzo(ai)pyrene, dibenzo(al)pyrene and 5-methylchrysene, where benzo(b)fluoranthene and benzo(j)fluoranthene are each counted individually (8th report on carcinogens, US Department of Health and Human Services, page 111-869).

The inventive carbon black may have a BET surface area (ASTM D-6556) of 10 to 1000 $m^2/g$, preferably of 20 to 120 $m^2/g$.

The inventive carbon black may have a DBP value (ASTM D-2414) of 10 to 200 ml/100 g, preferably of 20 to 120 ml/100 g.

The inventive carbon black may have a transmission (ASTM D-1618) of greater than 96%, preferably of greater than 99%.

The inventive carbon black may have a toluene extract (ASTM D-4527) of less than 0.04%, preferably of less than 0.03%.

The carbon black may be a furnace black, gas black, channel black, lamp black, thermal black, acetylene black, plasma black, inversion black, known from DE 195 21 565 and DE 198 39 925, Si-containing black, known from WO 98/45361 or DE 19613796, or metallic black, known from WO 98/42778, light arc black, or a carbon black which is a by-product of chemical production processes.

The inventive carbon black may have a pH (ASTM D-1512) of less than 7, preferably of less than 6, more preferably of less than 5, most preferably of less than 3.5.

The inventive carbon black may have a content of volatile constituents at 950° C. (DIN 53552) of >0.6%, preferably >2%, more preferably of >4.5%, especially preferably of >12%. The inventive carbon black may be an oxidized carbon black, preferably an oxidized gas black.

The invention further provides a process for preparing carbon black with a content of polycyclic aromatic hydrocarbons, measured by the 22 PAH method, of less than 5 ppm, preferably less than 0.5 ppm, more preferably less than 0.4 ppm, most preferably less than 0.2 ppm, which is characterized in that the starting carbon black is treated with electromagnetic radiation, preferably UV, for example far UV, VIS, IR, for example far IR, radiowave, for example USW, or microwave radiation, more preferably microwave radiation at 0.9-140 GHz, especially preferably microwave radiation at 2.45 GHz.

The starting carbon black may have an STSA surface area (ASTM D-6556) of <90 $m^2/g$, preferably 80 $m^2/g$, more preferably 30-80 $m^2/g$, most preferably 55-80 $m^2/g$.

The starting carbon black may have a BET surface area (ASTM D-6556) of 10 to 1000 $m^2/g$, preferably of 20 to 120 $m^2/g$.

The starting carbon black may have DBP value (ASTM D-2414) of 10 to 200 ml/100 g, preferably of 20 to 120 ml/100 g.

The starting carbon black may have a transmission (ASTM D-1618) of greater than 96%, preferably of greater than 99%.

The starting carbon black may have a toluene extract (ASTM D-4527) of less than 0.04%, preferably of less than 0.03%.

The starting carbon black may be powder, or wet- or dry-pelletized carbon black. The starting carbon black may be a furnace black, gas black, channel black, lamp black, thermal black, acetylene black, plasma black, inversion black, known from DE 195 21 565 and DE 198 39 925, Si-containing black, known from WO 98/45361 or DE 19613796, or metallic black, known from WO 98/42778, light arc black, or carbon black which is the by-product of a chemical production process. The starting carbon black may be activated by upstream reactions, for example oxidation, for example with ozone, nitric acid, nitrogen oxides or hypochlorite.

The starting carbon black may be a rubber black or pigment black.

Further starting carbon blacks may be: conductivity black, carbon black for UV stabilization, carbon black as a filler in systems, for example in rubber, bitumen or plastics, carbon black as a reducing agent in metallurgy.

The starting carbon black may preferably be a gas black, preferably an oxidized gas black.

The treatment with electromagnetic radiation can preferably be effected under inert atmosphere.

The inert atmosphere can be generated by nitrogen, noble gas, air-steam mixtures, steam or nitrogen-steam mixtures. The treatment can be performed at standard pressure, slightly elevated pressure or reduced pressure.

The electromagnetic radiation energy can be transferred contactlessly and without carrier medium.

A depletion of the PAHs to less than 5% of the loading of the starting carbon black may be possible. For the microwave-treated (MW-treated) samples, a lower PAH concentration can be achieved with increasing residence time.

In a preferred embodiment, the starting carbon black is treated with microwave radiation, more preferably microwave radiation at 0.9-140 GHz, especially preferably microwave radiation at 2.45 GHz, under an inert atmosphere.

The carbon black prepared by the process according to the invention may have an STSA surface area of <90 $m^2/g$, preferably $\leq$80 $m^2/g$, more preferably 30-80 $m^2/g$, most preferably 55-80 $m^2/g$.

The carbon black prepared by the process according to the invention may have a BET surface area (ASTM D-6556) of 10 to 1000 $m^2/g$, preferably of 20 to 120 $m^2/g$.

The carbon black prepared by the process according to the invention may have DBP value (ASTM D-2414) of 10 to 200 ml/100 g, preferably of 20 to 120 ml/100 g.

The carbon black prepared by the process according to the invention may have a transmission (ASTM D-1618) of greater than 96%, preferably of greater than 99%.

The carbon black prepared by the process according to the invention may have a toluene extract (ASTM D-4527) of less than 0.04%, preferably of less than 0.03%.

The treatment with electromagnetic radiation can be performed at temperatures of 150-600° C., preferably of 300-400° C.

The treatment with electromagnetic radiation can be performed within a reaction time of 1-120 min, preferably of 5-30 min.

The process according to the invention can be performed in an apparatus which consists of a reactor whose reactor wall, a portion of the reactor wall or a window is transparent to the electromagnetic radiation used.

The wall or window transparent to the electromagnetic radiation used may comprise glass, quartz glass or densely sintered $Al_2O_3$. The reactor wall temperature may be significantly below the product temperature.

The window transparent to the electromagnetic radiation used may be a glass window. The temperature in the irradiated carbon black may be 0 to 1000° C. The carbon black can be kept suspended by means of a levitator (induction, light, sound) or of a gas flow (fluidized bed).

The materials of the reactor can be adjusted appropriately with regard to radiation transparency.

The electromagnetic radiator sources, preferably magnetrons, may be arranged protected from the product, for example on the outside of the reactor wall in the region of the area transparent to radiation.

The radiation energy may be transferred contactlessly, i.e. without carrier medium, in a controlled and focussed manner with high power density onto the carbon black present in the reactor.

The energy input can be controlled and regulated.

The radiator source used may be: NIR and IR radiation sources (wavelength $\lambda$=500 μm-750 nm), such as electric lamps or ceramic radiators, gas-heated catalytic or surface radiators or gas/oil-heated pore burners, VIS lamps (wavelength $\lambda$=380 nm-750 nm), UV lamps (wavelength $\lambda$=380 nm-172 nm) or microwave radiators (frequencies $\omega$=900 MHz-140 GHz), for example magnetrons and gyrotrons.

The reactors used may be reactor types which have no moving parts which are attacked corrosively by the carbon black and the PAH materials or the substance mixture, thus leading to contamination of the product prepared.

The reactors used may be reactors for standard, elevated and reduced pressure, it being possible to establish defined gas atmospheres (for example inert gas) in the reactor.

The reactor may be a tubular reactor with external apparatus for mixing and conveying, for example a reactor with mechanical apparatus for mixing, for example a vibrating/shaking apparatus, rotary tube, vibrating conveyor or screw.

The reactor may be a fluidized bed reactor, fixed bed reactor or bubble column reactor. The reactor may be equipped with apparatus for mixing the feedstock or feedstock mixture (starting carbon black). The mixing can also be effected by means of flow of the substance or substance mixture through the reactor, for example by means of a continuous flow reactor, bubble column with or without packings, trickle bed reactor, fluidized bed reactor or freefall tower.

Apart from the electromagnetic radiation, the reactor may comprise an additional apparatus for heat input (hybrid reactor).

In the process according to the invention, the energy can be injected into the product in a controlled manner with high energy density and without carrier medium, which internally heats the product as a result of the energy dissipation of the electromagnetic radiation therein. According to the invention, this allows short reaction times to be achieved.

The process according to the invention can be used to prepare products which are extremely low in impurities.

Figure 2:
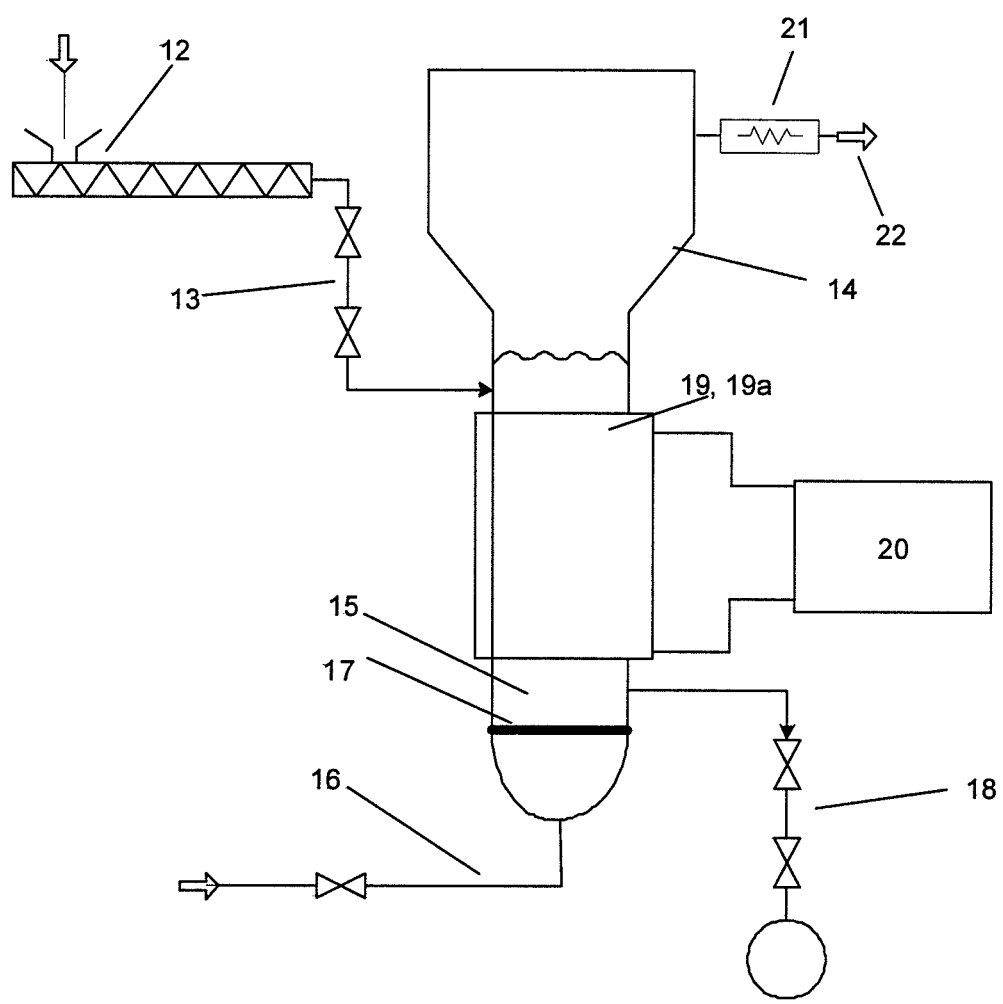
FIG. 2 shows a microwave fixed/fluidized bed reactor.

To perform the process according to the invention, the infrared (IR) delivery tube reactor shown in FIG. 1 or the microwave fixed bed/fluidized bed reactor shown in FIG. 2 can be used.

Index List for IR Delivery Tube Reactor (FIG. 1):
1. Metered addition of starting carbon black
2. Lock
3. IR-transparent reactor
4. Carbon black for heat treatment
5. Transport gas stream
6. Vibrating motion
7. Product discharge
8. IR radiator module with 8a one or more IR-transparent windows
9. Electrical actuation for the IR radiator modules
10. Trace heating
11. Offgas stream According to FIG. 1, the starting carbon black or the starting carbon black mixture is metered by means of the metering apparatus 1 via the lock 2 into the reactor 3. It falls as a solid powder or granules 4 for PAH depletion onto the bottom of the reactor 3 and is transported by means of a vibrating conveyor 6 to the product discharge 7. A generally heated gas stream 5 can additionally be flushed through the reactor and be utilized to transport away the gaseous products, predominantly PAH and the decomposition products thereof.

During the transport of the carbon black metered in through the reactor, the carbon black is purified by means of the IR radiator modules 8 which are electrically actuated by means of the apparatus 9. The IR radiation is injected through the IR-transparent window 8a into the reactor and then leads to rapid heating in the carbon black. The gas stream 11 is discharged from the reactor via the trace-heated transport line 10.

Index List for Microwave Fixed Bed/Fluidized Bed Reactor (FIG. 2):
12. Metered addition of starting carbon black
13. Lock
14. MW-transparent reactor
15. Carbon black for heat treatment as a fixed bed, fluidized bed or bubble column
16. Transport gas stream
17. Inflow tray
18. Product discharge
19. Resonator with 19a one or more MW-transparent windows
20. Microwave source
21. Trace heating
22. Offgas stream According to FIG. 2, the starting carbon black or the starting carbon black mixture is metered by means of the metering apparatus 12 via the lock 13 into the microwave reactor 14. The starting material falls as a substance or substance mixture for PAH depletion by means of a fixed bed, fluidized bed or bubble column 15, counter to the transport gas stream 16, onto the inflow base 17, and the excess of carbon black 15 can be discharged if required via the discharge apparatus 18.

The carbon black 15 is conveyed and/or kept in motion by means of the transport gas stream 16 in the direction of the microwave field—caused by the microwave radiator source 20, and the resonator 19. The microwave radiation penetrates virtually without loss through the window 19a into the reactor.

During the transport of the metered-in carbon black through the reactor, the carbon black is purified by means of the microwave radiation treatment.

The gas stream 22 is discharged from the reactor via the trace-heated transport line 21.

The gas used in the apparatus may be inert gas, nitrogen or a nitrogen/steam mixture.

The invention further provides for the use of the inventive carbon black as a filler, reinforcing filler, UV stabilizer, conductivity black or pigment.

The inventive carbon black can be used in rubber, plastics, printing inks, liquid inks, inkjet inks, toners, coating materials, paints, adhesives, batteries, pastes, paper, fuel cells, bitumen, concrete and other building materials. It can be employed as a reducing agent in metallurgy and as a conductive black.

The inventive carbon black can be used more particularly for applications in materials with food contact, for packaging printing inks, for toner applications or inkjet inks.

The invention further provides a polymer mixture, which is characterized in that it comprises at least one polymer and an inventive carbon black.

The inventive polymer mixture may contain 40-99.9% by weight, preferably 90-98% by weight, of polymer, based on the polymer mixture. The inventive polymer mixture may contain 0.1-60% by weight, preferably 1.5-3% by weight, of inventive carbon black, based on the polymer mixture. The polymer may be a thermoplastic polymer, a thermoset polymer, a thermoplastic elastomer, preferably polyolefin, more preferably polyethylene and polypropylene, polyvinyl chloride, melamine-formaldehyde resin, phenol resin, epoxy resin, polyamide, polyester, polyoxymethylene, polymethyl methacrylate, polycarbonate, polystyrene, polyethylene terephthalate or acrylonitrile-butadiene-styrene polymer, or else mixtures or copolymers of the above components.

The invention further provides a liquid ink, which is characterized in that it contains less than 5% by weight of binder, at least one humectant, a solvent and an inventive carbon black.

The inventive liquid ink may contain 5 to 95% by weight, preferably 30 to 80% by weight, of solvent, based on the liquid ink. The inventive liquid ink may contain 0.1 to 10% by weight, preferably 1 to 5% by weight, of inventive carbon black, based on the liquid ink. The solvent may be water, alcohols, ketones, esters, or aliphatic or aromatic hydrocarbons.

The invention further provides a toner, which is characterized in that it comprises at least one fluidizer, a polymer and an inventive carbon black.

The inventive toner may contain 30 to 95% by weight, preferably 60 to 90% by weight, of polymer, based on the toner. The inventive toner may contain 1 to 20% by weight, preferably 2 to 15% by weight, of inventive carbon black, based on the toner. The polymer may be a polyester resin, a styrene copolymer or a cycloolefin copolymer. The fluidizer may be silica, preferably fumed silica, or carbon black.

The advantage of the inventive carbon black is the low content of harmful polycyclic aromatic hydrocarbons.

A further advantage is that the inventive carbon blacks, in spite of depleted PAHs, have a comparatively high degree of oxidation, measured as volatile constituents at 950° C.

EXAMPLES

The carbon black analysis indices of the carbon blacks prepared are determined to the following standards:

| | |
|---|---|
| STSA surface area: | ASTM D-6556 |
| BET surface area: | ASTM D-6556 |
| DBP absorption: | ASTM D-2414 |

The starting carbon black used in the examples is a pelletized starting carbon black A with STSA surface area 83 $m^2/g$ and an oil value (by yield point method DIN EN ISO 787-5) of 460 g/100 g.

Example 1

To reduce the content of polycyclic aromatic hydrocarbons (PAHs), pelletized carbon black is treated in an IR pilot plant as described in FIG. 1. The residence time and the temperature are as described in Table 1.

The starting carbon black used is starting carbon black A. In the test series described here, the PAH content is examined on the basis of the 22 PAH method and 15 PAH method (Table 1).

TABLE 1

| Sample | Residence time [min] | Temp. [° C.] | STSA [$m^2/g$] | Purge gas | 15 PAH method [mg/kg] | Depletion to % of c0 | 22 PAH method [mg/kg] | Depletion to % of c0 |
|---|---|---|---|---|---|---|---|---|
| 1 Inventive carbon black | 120 | 450 | 89.7 | $N_2$ | 0.65 | 1.1 | 4.17 | 0.5 |
| 2 Starting carbon black A (Ref.) | — | — | 82.8 | — | 61.7 (c0) | 100 | 905.0 (c0) | 100 |

The invention further provides a printing ink, which is characterized in that it comprises at least one binder, a solvent and an inventive carbon black.

The inventive printing ink may contain 10 to 30% by weight of binder, based on the printing ink. The inventive printing ink may contain 10 to 75% by weight of solvent, based on the printing ink. The inventive printing ink may contain 3 to 40% by weight of inventive carbon black, based on the printing ink. The solvent may be water, alcohol, ketone, acetate or any kind of oil, or a mixture with at least one of these components.

It was found that a depletion to less than 1% of the starting loading of PAHs is possible.

Example 2

To reduce the content of polyaromatic hydrocarbons (PAHs), pelletized carbon black is treated in a microwave system as described in FIG. 2. The residence time and the temperature are described in Table 2.

The starting carbon black used is starting carbon black A. In the test series described here, the PAH content is examined on the basis of the 22 PAH method and 15 PAH method (Table 2).

TABLE 2

| Sample | Residence time [min] | Temp. [° C.] | STSA [m²/g] | Purge gas | 15 PAH method [mg/kg] | Depletion to % of c0 | 22 PAH method [mg/kg] | Depletion to % of c0 |
|---|---|---|---|---|---|---|---|---|
| 2 Starting carbon black A (Ref.) | — | — | 82.8 | — | 61.7 (c0) | 100 | 905.0 (c0) | 100 |
| 3 Inventive carbon black | 5 | 400 | 83.0 | N₂ | n.d. | n.d. | 0.44 | 0.1 | n.d. = not detectable

In the case of the sample treated in the microwave, a very significant depletion of the PAHs to 0.1% of the starting loading is achieved.

Example 3

In a microwave system as described in FIG. 2, an amount of approx. 80 g of starting carbon black A is introduced. The microwave reactor is purged with nitrogen (5 l/h) before the start of the experiment, then irradiated with microwaves and, after the end of the experiment, cooled to a temperature of <120° C. under nitrogen.

The residence times and the temperatures are varied from 1-20 min and 400-600° C. respectively. The time after attainment of the target temperature is measured.

The temperature is recorded by means of a PC.

In Table 3, different parameters are varied.

TABLE 3

| Sample | Irradiation time (min) | Temperature (° C.) | STSA (m²/g) | Volatile constituents 950° C. % | Reduction in volatile constituents 950° C. by (%) | 22 PAH method (ppm) |
|---|---|---|---|---|---|---|
| 2 Starting carbon black A (Ref.) | 0 | 0 | 82.8 | 4.4 | — | 905 |
| 4 Inventive carbon black | 10 | 400 | 80.2 | 3.1 | 30 | 1.250 |
| 5 Inventive carbon black | 1 | 600 | 81.9 | 1.4 | 68 | 4.860 |
| 6 Inventive carbon black | 5 | 600 | 82.9 | 1.9 | 57 | 1.620 |
| 7 Inventive carbon black | 10 | 600 | 78.8 | 1.6 | 64 | 0.357 |

In the case of the inventive carbon blacks, the PAHs are reduced significantly. At 600° C., the PAHs are reduced to less than 0.4 ppm.

Example 4

Comparative Example for Simple Thermal Treatment in a Drying Cabinet 100 g of a starting carbon black with STSA surface area 75 m²/g and an oil value (by yield point method DIN EN ISO 787-5) of 460 g/100 g are distributed on a stainless steel sheet over an area of 30×30 cm. Heat treatment is effected under nitrogen in a drying cabinet at 300° C. for 1 h.

TABLE 4

| Sample | Residence time [min] | Temp. [° C.] | STSA [m²/g] | Purge gas | 22 PAH method [mg/kg] | Depletion to % of c0 |
|---|---|---|---|---|---|---|
| Starting carbon black | — | — | 75 | — | 1670 (c0) | 100 |
| Heat-treated carbon black | 60 | 300 | 74 | N2 | 250 | 15 |

The thermal treatment in the drying cabinet (Table 4) shows a lower depletion of PAHs compared to the carbon blacks prepared by the process according to the invention.

The invention claimed is:

1. A process for preparing carbon black with a content of polycyclic aromatic hydrocarbons, measured by the 22 PAH method, of less than 5 ppm, characterized in that the starting carbon black is treated with microwave radiation.

2. The process for preparing carbon black according to claim 1, characterized in that an inert atmosphere is used.

3. The process for preparing carbon black according to claim 1, characterized in that the starting carbon black used is a gas black.

* * * * *